(12) United States Patent
Narkar et al.

(10) Patent No.: US 9,351,308 B2
(45) Date of Patent: May 24, 2016

(54) MULTI-MODAL COMMUNICATION PRIORITY OVER WIRELESS NETWORKS

(71) Applicant: Microsoft Corporation, Redmond, WA (US)

(72) Inventors: Vishal Narkar, Bellevue, WA (US); Amer Hassan, Kirkland, WA (US); Sundeshwaran Raman, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 271 days.

(21) Appl. No.: 13/801,922

(22) Filed: Mar. 13, 2013

(65) Prior Publication Data

US 2013/0242903 A1    Sep. 19, 2013

Related U.S. Application Data

(60) Provisional application No. 61/611,177, filed on Mar. 15, 2012.

(51) Int. Cl.
*H04W 72/08* (2009.01)
*H04L 29/06* (2006.01)
(Continued)

(52) U.S. Cl.
CPC .............. *H04W 72/087* (2013.01); *H04L 47/72* (2013.01); *H04L 47/808* (2013.01);
(Continued)

(58) Field of Classification Search
CPC .............. H04W 72/087; H04W 76/022; H04L 65/1069; H04L 65/4038; H04L 65/1036; H04L 65/1059

USPC ......... 370/229, 230, 310, 328, 329, 351, 389, 370/395.1, 395.2, 395.21; 455/403, 422.1, 455/450, 452.1, 452.2

See application file for complete search history.

(56) References Cited

U.S. PATENT DOCUMENTS

| | | |
|---|---|---|
| 5,951,637 A | 9/1999 | Kuzma et al. |
| 6,618,363 B1 | 9/2003 | Bahl et al. |

(Continued)

FOREIGN PATENT DOCUMENTS

WO    2006127328    11/2006

OTHER PUBLICATIONS

"International Search Report", Mailed Date: Jun. 26, 2013, Application No. PCT/US2013/031110, Filed date: Mar. 14, 2013, pp. 11.

(Continued)

*Primary Examiner* — Obaidul Huq
(74) *Attorney, Agent, or Firm* — Andrew Smith; Doug Barker; Micky Minhas

(57) ABSTRACT

Prior reservation of bandwidth is enabled during conference setup. Through synchronization of directory databases at one or more multi-modal communication application deployment sites and use of a multi-modal communication enabled node at an evolved packet core (EPC), bandwidth is statically or dynamically allocated for communication sessions based on requesting user profile, requested modality, location of the user, and similar factors such that a desired Quality of Service (QoS) is maintained during the communication session. Service Providers (SPs) provide differentiated QoS by pre-reserving bandwidth margin over and above what is required. The bandwidth margin is used by the SPs to include additional error correction mechanism. Dynamic bandwidth allocation factors in the location of the UC devices and roaming status.

14 Claims, 8 Drawing Sheets

(51) Int. Cl.
*H04L 12/911* (2013.01)
*H04L 12/927* (2013.01)
*H04W 76/02* (2009.01)

(52) U.S. Cl.
CPC ....... *H04L 65/1036* (2013.01); *H04L 65/1059* (2013.01); *H04L 65/1069* (2013.01); *H04L 65/4038* (2013.01); *H04W 76/022* (2013.01)

(56) References Cited

U.S. PATENT DOCUMENTS

| | | | |
|---|---|---|---|
| 6,665,311 | B2 | 12/2003 | Kondylis et al. |
| 6,937,566 | B1 | 8/2005 | Forslow et al. |
| 2004/0013119 | A1* | 1/2004 | MeLampy et al. ....... 370/395.21 |
| 2005/0147072 | A1* | 7/2005 | Mahendran et al. .......... 370/338 |
| 2005/0175160 | A1* | 8/2005 | Simpson et al. ........... 379/88.13 |
| 2006/0023649 | A1* | 2/2006 | Tillet et al. .................... 370/310 |
| 2006/0222008 | A1 | 10/2006 | Aaron et al. |
| 2007/0002868 | A1 | 1/2007 | Qian et al. |
| 2007/0165630 | A1 | 7/2007 | Rasanen et al. |
| 2007/0263818 | A1* | 11/2007 | Sumioka et al. ......... 379/201.01 |
| 2008/0200195 | A1* | 8/2008 | Abe et al. ...................... 455/501 |
| 2008/0205348 | A1* | 8/2008 | Malladi ........................ 370/335 |
| 2009/0129405 | A1 | 5/2009 | Lauwers et al. |
| 2009/0203379 | A1* | 8/2009 | Karaoguz .................... 455/436 |
| 2010/0280934 | A1 | 11/2010 | Kerr et al. |
| 2011/0134765 | A1 | 6/2011 | Rector et al. |
| 2011/0153863 | A1 | 6/2011 | Khan et al. |
| 2011/0305137 | A1 | 12/2011 | Chu et al. |
| 2012/0314597 | A1 | 12/2012 | Singh et al. |

OTHER PUBLICATIONS

Chang et al.,"Dynamic-Grouping Bandwidth Reservation Scheme for Multimedia Wireless Networks", IEEE Journal Selected Areas in Communications, vol. 21, Issue 10, Dec. 2003; (http://ieeexpiore.ieee.org/ielx5/49/28068/01254573.pdf?tp=&arnumber=1254573&isnumber=28068).

* cited by examiner

MULTI-MODAL COMMUNICATION PRIORITY OVER WIRELESS NETWORKS

CLAIM OF PRIORITY

The present application claims priority to and the benefit of the filing date of U.S. Provisional Application Ser. No. 61/611,177 filed on Mar. 15, 2012. The Provisional Application is incorporated by reference in its entirety hereby.

BACKGROUND

As an alternative to Public Switched Telephone Network (PSTN) systems, cellular phone networks have proliferated over the last decades, where users with cellular phones have access to one or more networks at almost any location. Also a recent development is the wide spread use of Voice over IP (VoIP) telephony, which uses internet protocol (IP) over wired and wireless networks. With the availability of such diverse types of communication networks and devices capable of taking advantage of various features of these networks, enhanced communication systems bring different communication networks together providing until now unavailable functionality such as combining various modes of communication (e.g. instant messaging, voice/video communications, data/application sharing, white-boarding, and other forms of communication may be combined with presence and availability information of subscribers).

This technology is also referred to as Unified Communications (UC). A network of servers manages end devices capable of handling a wide range of functionality and communication while facilitating communications between the more modern unified communication network devices and other networks (e.g. PSTN, cellular, etc.). In addition to providing subscribers with the enhanced capabilities such as providing instructions to callers for various status, categories, alternate contacts, calendar information, and comparable features, some UC systems may include collaboration features enabling users to share and collaborate in creating and modifying various types of documents and content may be integrated with malts-modal communication systems providing different kinds of communication and collaboration capabilities. Such, integrated systems are sometimes referred to as Unified Communication and Collaboration (UC&C) systems.

Enhanced communication systems providing multi-modal communications operate in a similar fashion to (sometimes the same) data exchange networks where designated servers and their backups provide services (e.g. routing of calls). Session Initiation Protocol (SIP) is a commonly used communication protocol between components of such systems. Communication between end devices is also facilitated increasingly using wireless networks including, but not limited to, Wireless Local Area Networks (WLANs), Wide Area Networks (WANs), and cellular networks. With, the increase in usage of real-time collaboration such as audio, video, and application sharing, the burden on wireless networks is raised. Enterprise-grade Unified Communication is typically associated with high Quality of Service (QoS) including the assignment of proper bandwidth for voice and video. Bandwidth prioritization creates a challenge for service providers to guarantee multi-modal communication service to their customers when the only connection, available is Wireless WAN (WWAN) such as 3G or 4G networks.

SUMMARY

This summary is provided to introduce a selection of concepts in a simplified form that are further described, below in the Detailed Description. This summary is not intended to exclusively identify key features or essential features of the claimed subject matter, nor is it intended as an aid in determining the scope of the claimed subject matter.

Embodiments are directed to enabling prior reservation of bandwidth during conference setup. Through synchronization of directory databases at one or more multi-modal communication application deployment sites and use of a multi-modal communication enabled node at an evolved packet core (EFC), bandwidth may be statically or dynamically allocated for communication sessions based on requesting user profile, requested modality, location of the user, and similar factors such that a desired Quality of Service (QoS) is maintained during the communication session. Service Providers (SPs) may also be able to provide differentiated QoS, such as close to 100% reliability of connection for financial firms, by pre-reserving bandwidth margin over and above what is required. The bandwidth margin may be used by the SPs to include additional error correction mechanism. Dynamic bandwidth allocation factors in the location of the UC devices and roaming status.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
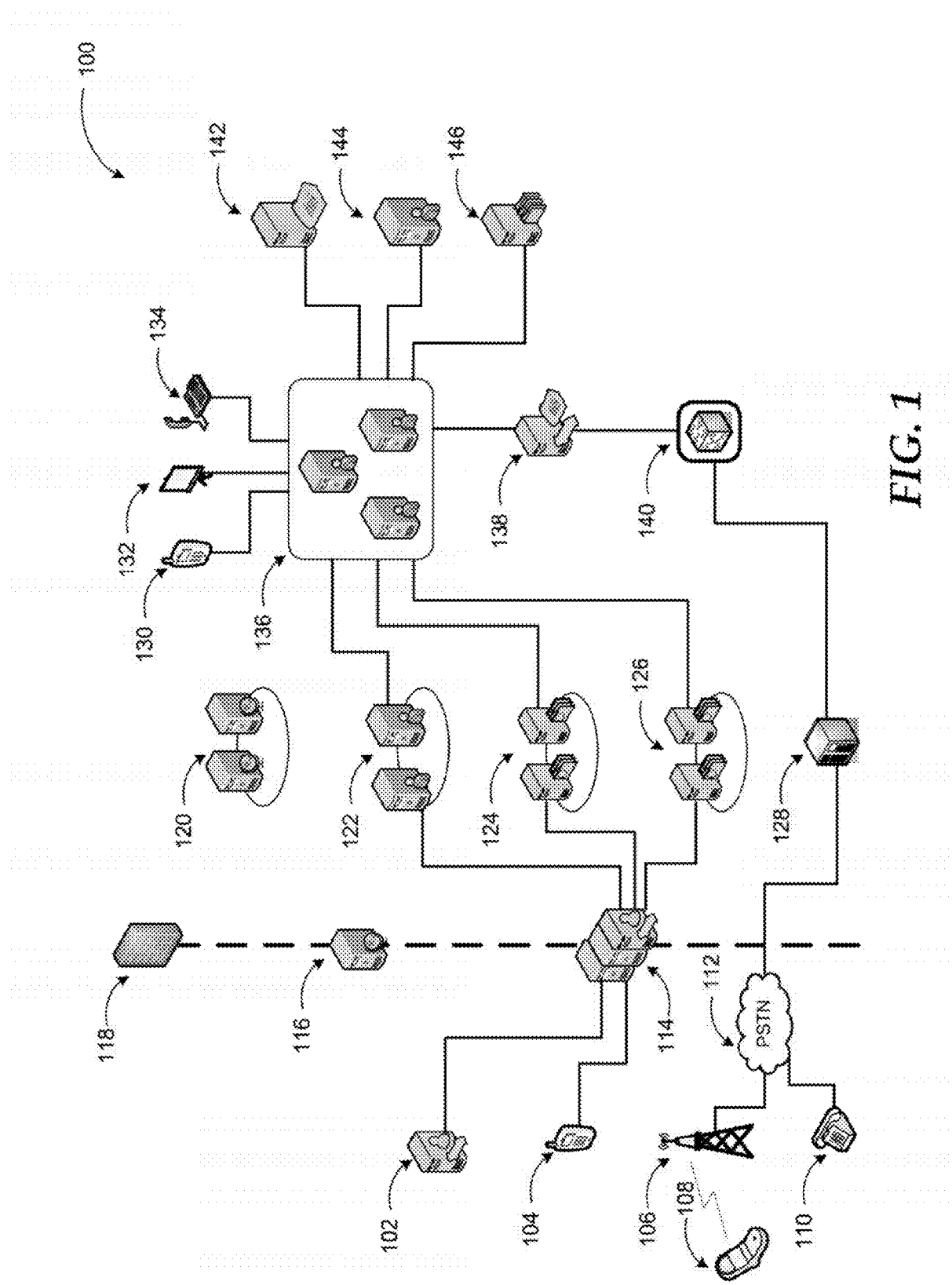
FIG. 1 is a diagram illustrating an example enhanced communications system such as a UC system, where embodiments may be implemented for prioritizing multi-modal communications in wireless networks.

As briefly described above, bandwidth for multi-modal communications may be reserved a priori during conference setup. Through synchronization of directory databases at one or more multi-modal communication application deployment sites and use of a multi-modal communication enabled node at an evolved packet core (EPC), bandwidth may be statically or dynamically allocated for communication sessions based on requesting user profile, requested modality, location of the user, and similar factors such that a desired Quality of Service (QoS) is maintained during the communication session.

In the following detailed description, references are made to the accompanying drawings that form apart hereof, and in which are shown by way of illustrations specific embodiments or examples. These aspects may be combined, other aspects may be utilized, and structural changes may be made without, departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that, comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, and a flash drive.

Throughout this specification, the term "platform" may be a combination of software and hardware components for providing multimodal communication services such as audio calls, video conferences, and/or data exchange. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

FIG. 1 includes diagram 100 illustrating an example enhanced communications system such as a UC system, where embodiments may be implemented for prioritizing multi-modal communications over wireless networks. A unified communication (UC) system is an example of modern communication systems with a wide range of capabilities and services that can be provided to subscribers. A unified communication system is a real-time communications system facilitating email exchange, instant messaging, presence, audio-video conferencing, web conferencing, and similar functionalities.

In a unified communication (UC) system such as the one shown in diagram 100, users may communicate via a variety of end devices 130, 132, 134, which are client devices of the UC system. Each, client device may be capable of executing one or more communication, applications for voice communication, video communication, instant messaging, application sharing, data sharing, and the like, in addition to their advanced functionality, the end devices may also facilitate traditional phone calls through an external connection such as through Private Branch Exchange (PBX) 128 to a Public Switched Telephone Network (PSTN) 112. Further communications through PSTN 112 may be established with a telephone 110 or cellular phone 10S via cellular network tower 106. End devices 130, 132, 134 may include any type of smart phone, cellular phone, any computing device executing a communication application, a smart automobile console, and advanced phone devices with additional functionality.

The UC system shown in diagram 100 may include a number of servers performing different tasks. For example, edge servers 114 may reside in a perimeter network and enable connectivity through UC network(s) with other users such as remote user 104 or federated server 102 (for providing connection to remote sites), it should be noted that federated sessions occur between two or more enterprise networks, but the media may flow through the internet in a system according to embodiments. Furthermore, remote users (or sites) are usually connected to the UC system via the Internet. A Hypertext Transfer Protocol (HTTP) reverse protocol proxy server 116 may also reside along the firewall 118 of the system. Edge servers 114 may be specialized for functionalities such as access, web conferencing, audio/video communications, and so on. Inside the firewall 118, a number of clusters for distinct-functionalities may reside. The clusters may include web servers for communication services 120, directory servers 122, web conferencing servers 124, and audio/video conferencing and/or application sharing servers 126. Depending on provided communication modalities and functionalities, fewer or additional clusters may also be included in the system.

The clusters of specialized servers may communicate with a pool of registrar and user services servers 136. The pool of registrar and user services servers 136 is also referred as a data center. A UC system may have one or more data centers, each of which may be at a different site. Registrar servers in the pool register end devices 130, 132, and 134, and facilitate their communications through the system acting as home servers of the end points. User services server(s) may provide presence, backup monitoring, and comparable management functionalities. User services servers 136 may include a cluster of registrar servers. The registrar servers may act as backups to each other.

Mediation server 138 mediates signaling and media to and from other types of networks such as a PSTN or a cellular network, (e.g. calls through PBX 128) together with IP-PSTN gateway 140. Mediation server 138 may also act as a Session Initiation Protocol (SIP) user agent, in a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a commonly used method. SIP is an application-layer control (signaling) protocol for creating, modifying, and terminating sessions with one or more participants. It can be used to create two-party, multiparty, or multicast sessions that include Internet telephone calls, multimedia distribution, and multimedia conferences. SIP is designed to be independent of the underlying transport layer.

Additional components of the UC system, may include messaging server 142 for processing voicemails and similar messages, application server 144 for specific applications, and archiving server 146. Each of these may communicate with the data center pool of registrar and user services servers 136. Various components of the system may communicate using protocols like SIP, HTTP, and comparable ones.

While the example system in FIG. 1 has been described with specific components such as registrar servers, mediation servers, A/V servers, and similar devices, embodiments are not limited to these components or system configurations and can be implemented with other system configuration, employing fewer or additional components. Functionality of enhanced communication systems with prioritization of multi-modal communications over wireless networks capability may also be distributed among the components of the systems differently depending on component capabilities and system configurations. Furthermore, embodiments are not limited to unified communication systems. The approaches discussed here may be applied to any data exchange in a networked communication environment using the principles described herein.

Figure 2:
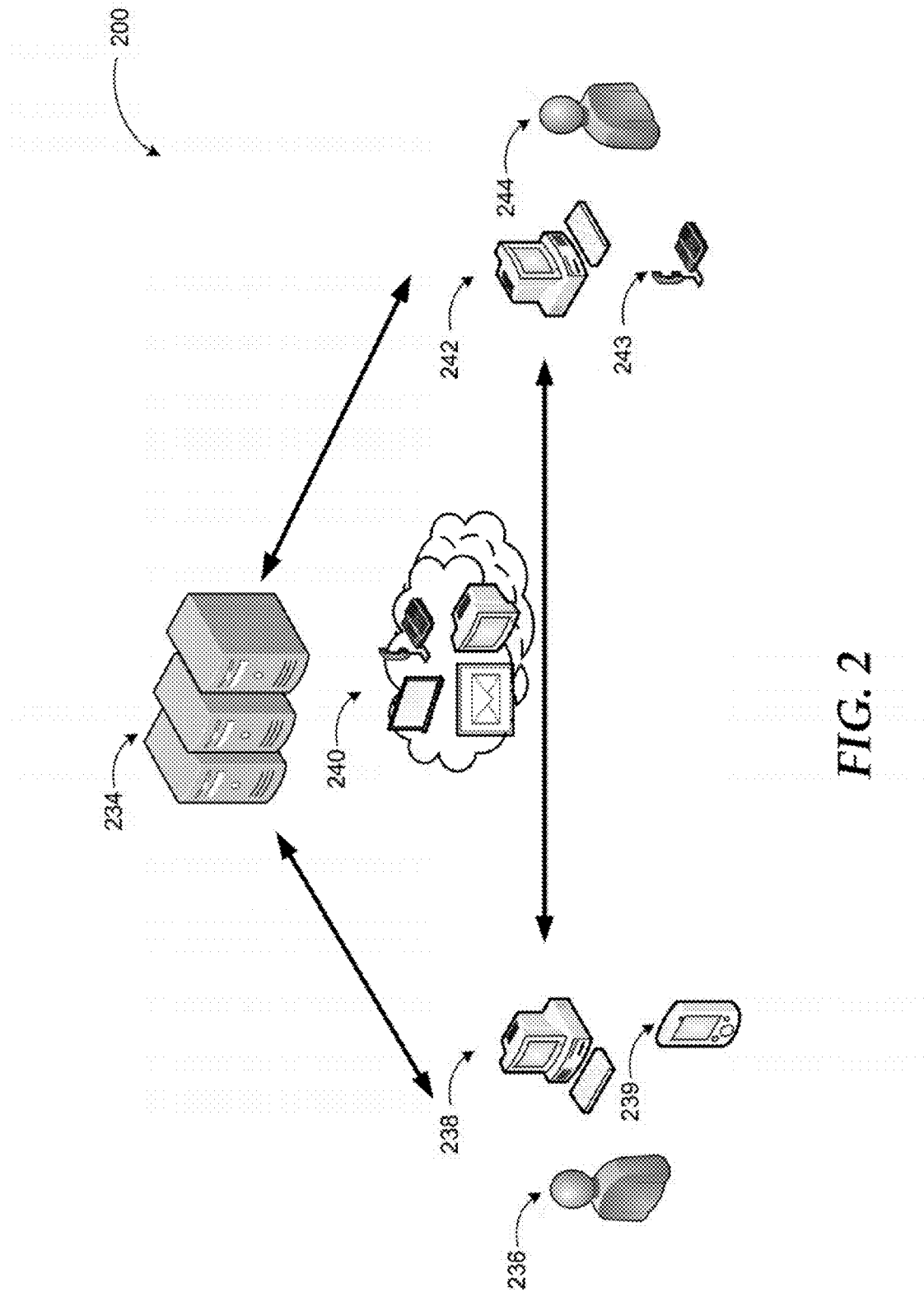
FIG. 2 is a conceptual diagram illustrating a basic example system for providing multimodal communications.

FIG. 2 is a conceptual diagram illustrating a basic example system for providing multimodal communications. While a system according to embodiments is likely to include a number of servers, client devices, and services such as those illustratively discussed in FIG. 1, only those relevant to embodiments are shown in FIG. 2.

As mentioned previously, communication between two or more users in an enhanced communication system such as a UC system may be facilitated through multiple devices with varying communication mode capabilities. In a UC system employing SIP for communication between endpoints, a caller may initiate a communication session by sending an INVITE to the called party. The called party may potentially accept the INVITE from a number of different devices or endpoints. However, not all these devices may be able to handle all forms or modalities of communication. In a system according to embodiments, the INVITE may be sent to devices capable of handling the requested mode of communication.

According to an example scenario, a communication server (e.g. server 234) may facilitate a conversation between a client application providing communication UIs to a user and an automated application. The conversation may start in audio mode (e.g. a user talking to an automated service center). Later in the conversation, the application may request the user to provide a form and send the form as file transfer to the client application of the user. The client application may send the file back, which may be facilitated by another server responsible for file transfers and processing (collaboration). Conversations may also be facilitated in other modes, some of which may be added or dropped during the conversation.

The basic components of a system according to embodiments include client devices 238 and 239 executing communication applications for user 236, client devices 242 and 243 executing different versions of the same or a different communication application for user 244, and servers 234. The communication applications for users 236 and 244 facilitate multi-modal communication sessions 240 (over one or more networks) between the users 236 and 244, as well as the users and automated applications on one or more of the servers 234.

Each modality within, the conversation, may be managed by a different server such, as a file server for file exchanges, an A/V server for managing audio/video communications, an email server for managing exchange of emails or instant messages, and so on. Other modalities that may be used video conferencing, white-boarding, file transfer, and comparable ones.

Figure 3:
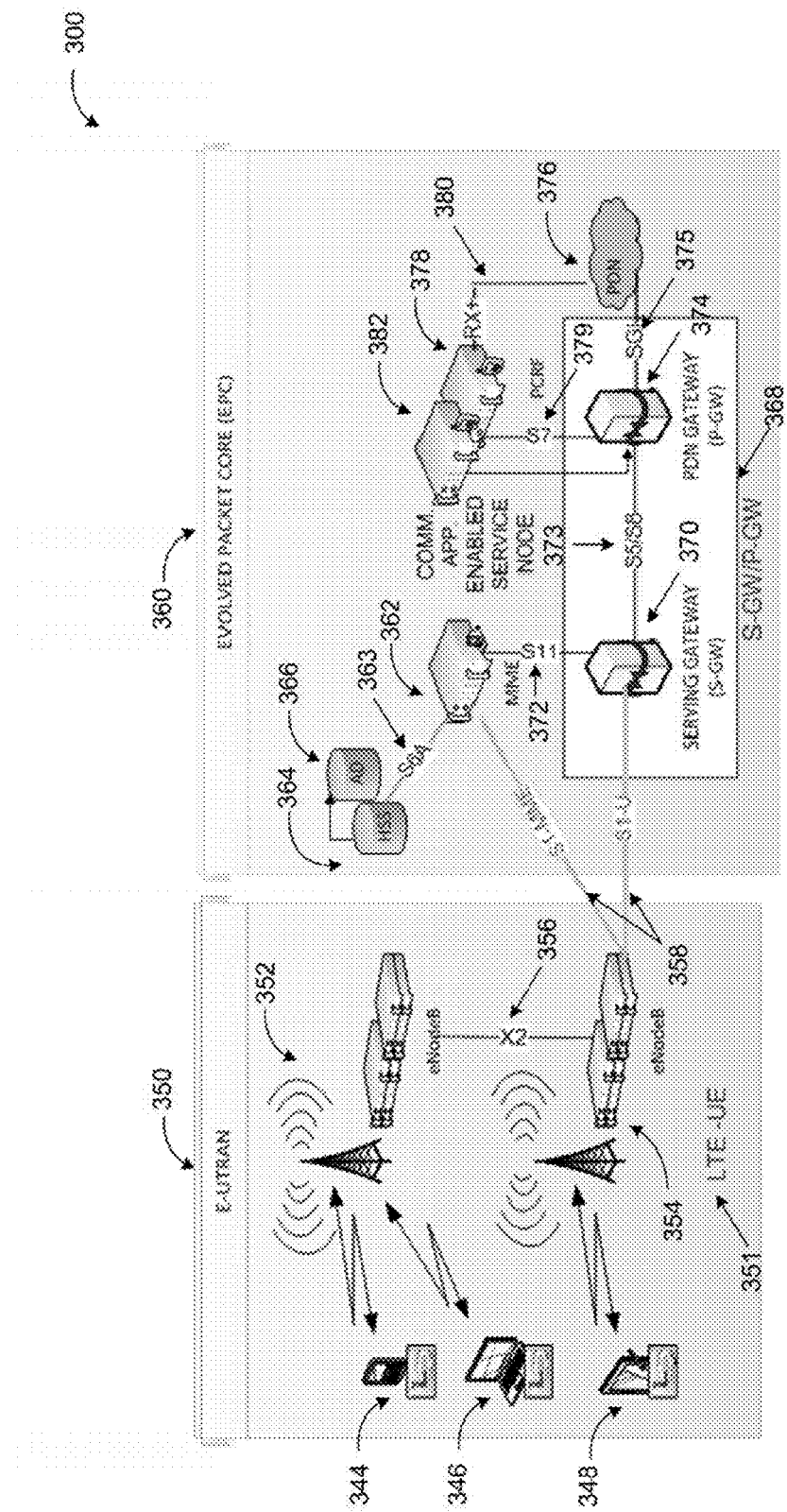
FIG. 3 illustrates major components of a system according to some embodiments in the wireless network and evolved package core (EPC) segments.

FIG. 3 illustrates major components of a system according to some embodiments in the wireless network and evolved package core (EPC) segments.

As shown in the diagram 300, mobile end devices 344, 346, and 348 may be communicating within a wireless Evolved UMTS Terrestrial Radio Access Network (E-UTRAN) 350 utilizing Long Term Evolution User Equipment (LTE-UE) 351, E-UTRAN 350 may include eNodeBs 352 and 354, hardware that may connect to the mobile phone network allowing communication with the mobile end devices 344, 346, and 348. The eNodeBs 352 and 354 may act similar to base receiver stations and may be connected to each other by an X2 interface 356 and to an Evolved Packet Core (EPC) 360 via one or more S1 interfaces 358 as illustrated in the figure.

Within the EPC 360, the one or more S1 interfaces 358 may connect from the enobeBs 352 and 354 to a Mobility Management Entity (MME) 362 and a Serving Gateway/Packet Data Network Gateway (S-GW/P-GW) 368. The MME 362 may perform functions related to subscriber and session management and may connect through an S6 interface 363 to a Home Subscriber Server database (HHS) 364 that may store and update data and may create security information. The HHS 364 may then connect to an active directory server (AD) 366. The Serving Gateway/Packet Data Network Gateway (S-GW/P-GW) 368 may include a serving gateway (S-GW) 370 and a packet data network gateway (P-GW) 374. The S-GW 370 may be connected to the MME 362 through a S11 interface 372 and may maintain data pathways between the eNodeBs and the P-GW through a S5/S8 interlace 373. The P-GW 374 may be the end point of packet, data interface SGI 375 towards the Packet Data Network (PDN) 376 and may support policy enforcement features, packet filtering, and charging support. The P-GW 374 may also connect to a Policy and Charging Rotes Function (PCRF) 378 and a Communication Application Enabled Service Node 382 through a S7 interface 379. The PCRF 378 may manage policy enforcement and may also loop to connect to the PDN 376 through a RX+ interface 380. The Communication Application Enabled Service Node 382 may feedback through the S7 interface 379 to the P-GW 374.

Telepresence is emerging as an attractive service to be provided by carriers such as service providers (SPs), internet service providers (ISPs), etc. Providing this service over a wireless network may be desirable for the mobile UC user. There is, however, a challenge in provisioning bandwidth for this type of service due to the high bandwidth requirement.

In a system according to embodiments, bandwidth (BW) allocation over the wireless networks may be accomplished statically or dynamically by a multi-modal communication application enabled node 382 at the EPC 360 facilitating communication with the eNodeB 352 or 354 and similar components of the wireless network, which enable communication between individual user mobile end devices 344, 346, and 348 through base stations, routers, access points, etc. In some embodiments, the bandwidth allocation may also take into consideration the type of the wireless network such as 3G, 4G, GPRS, etc. and offload capability such as over Wi-Fi.

Figure 4:
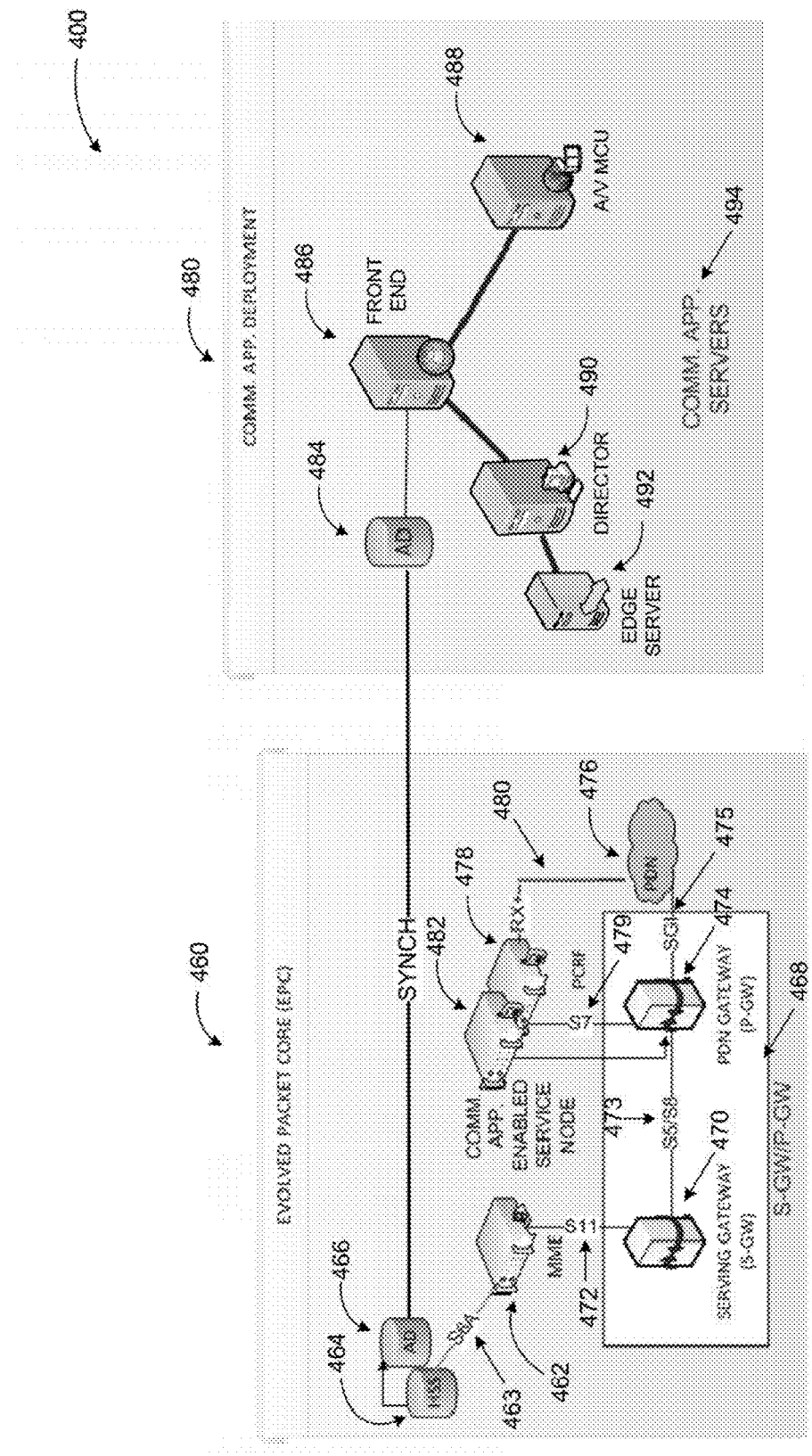
FIG. 4 illustrates major components of a system according to some embodiments in multi-modal communication application deployment and EPC segments.

FIG. 4 illustrates major components of a system according to some embodiments in multi-modal communication application deployment and EPC segments.

As shown in the diagram 400, an EPC segment 450, described in detail in FIG. 3, may synchronize with, a communication application deployment segment 480. The synchronization may occur between an active directory server (AD) 464 of the EPC segment and an active directory server (AD) 484 of the communication application deployment segment. The AD 484 of the communication application deployment segment may connect to a front end server 486. The front end server 486 may then, communicate with an audio/visual multipoint conferencing unit (A/V MCU) server 488 and a director server 490. The A/V. The director server 490 may further communicate with an edge server 492. The front end server 486, A/V MCU server 488, director server 490, and edge server 492 may comprise the communication application servers of the communication application deployment segment.

The database HSS 462 and the directory server (AD) 464 may be synchronized together in terms of identities associated with the multi-modal communication application. The multi-modal communication application identity such as SIP URI etc. can be shared between HSS and AD. This multi-modal communication application identity (e.g. SIP URI) may be tied to MSS identities such as International Mobile Subscriber Identity (IMSI), enterprise network identity (MSISDN), etc. in this case AD/HSS may be separate databases or a single database. A sample table in the database may look as follows:

creation of rules and then automatically making intelligent policy decisions for each subscriber active on the network. Such a network may offer multiple services, quality of service (QoS) levels, and charging rules.

The multi-modal communication application, enabled service node 482 may be a separate node or part of the PCRF 478. The multi-modal communication application enabled node goes through each packet (INVITE) and instructs the PCRF to allocate a selected amount of bandwidth based on the above described factors. In some embodiments, the allocation may be dynamic, where, for example, in response to a change in a user profile, the allocated bandwidth may be modified.

The above-described functionality may be extended by applying the same principle to provide dynamic bandwidth allocation. PCRF 478 or any other relevant node (multi-modal communication application enabled service node 482) in the EPC domain may be modified to cheek the incoming multi-modal communication application INVITEs and allocate bandwidth appropriately based on session description protocol (SDP) content of the INVITE. For example, for a video conference INVITE message, higher bandwidth can be allocated by PCRF in real-time. Furthermore, the BW allocation may be based on user profiles (for example, a user higher in the hierarchy of an enterprise may be given higher BW over a regular user or a presenter in an online conference may be given higher BW than regular participants).

Also, whenever a meeting is scheduled online, PCRF 478 or any other relevant node (multi-modal communication application enabled service node 482) in EPC domain may

| MSISDN | IMSI | SIP URI | QoS | BW | Time | App. | Location |
|---|---|---|---|---|---|---|---|
| 123 345 5678 | 310260111111111 | Vishal@contoso.com | 50 | 15 Mbps | 8:00 am to 9:00 am | Video | Bldg 31 (good coverage) |
| 123 345 5679 | 310260111111112 | Amer@fabricam.com | 40 | 18 Mbps | 9:00 am | Voice | Bldg 30 (medium coverage) |

When a multi-modal communication application client tries to register with multi-modal communication application server through wireless macro network, identities such as IMSI, MSISDN may be used during establishing PDP context with BPC 460. The network element PCRF 478 from EPC domain monitors incoming PDP connectivity and verities the identities (MSISDN, IMSI) against HSS. In turn, PCRF can apply network based policies to allocate specific bandwidth/QoS for multi-modal communication application modalities such as voice, video, application share etc. after comparing against the database.

Policy and Charging Rules Function (PCRF) 478 is the node designated in real-time to determine policy rules in a multimedia network. As a policy tool, the PCRF plays a central role in next-generation networks. Unlike earlier policy engines that were added on to an existing network to enforce policy, the PCRF may be a software and/or hardware component that operates at the network core and efficiently accesses subscriber databases and other specialized functions, such as a charging systems, in a scalable, reliable, and centralized manner. Because it operates in real time, the PCRF has an increased strategic significance and broader potential role than traditional policy engines. The PCRF is the part of the network architecture that aggregates information to and from the network, operational support systems, and other sources (such as portals) in real time, supporting the receive die request and modify the table in HSS 462/AD 464 to reflect the time of the meeting along with its application type. This way, PCRF can allocate a specific amount of bandwidth for that duration of time based on type of application. This node may also view the location of the meeting and check if that location has enough wireless macro network coverage. Based on location and coverage type, the QoS/bandwidth allocation, can be changed dynamically. The location (or location attribute) may also be a roaming status of the user(s).

Figure 5:
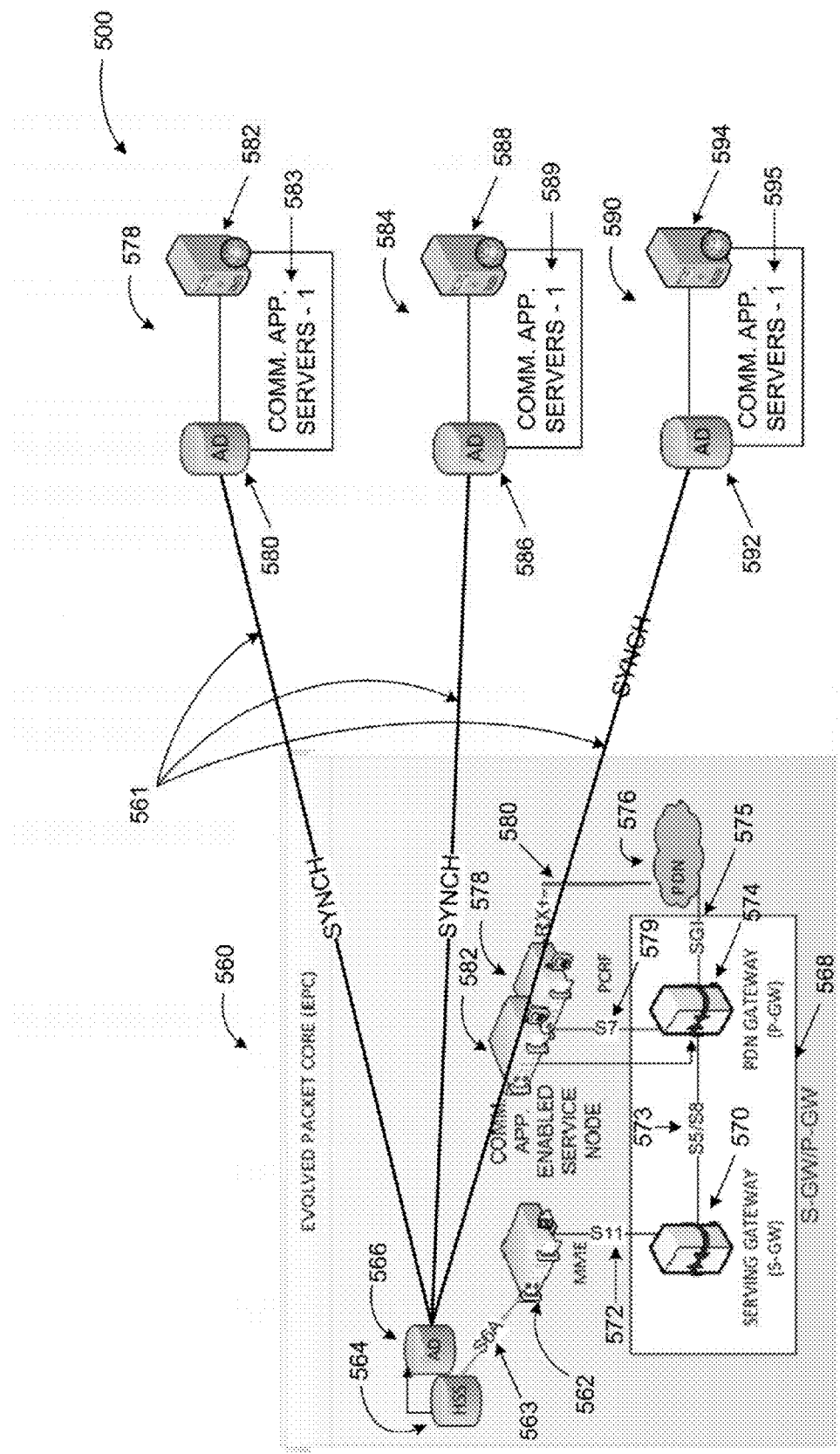
FIG. 5 illustrates major components of a system according to some embodiments where a directory server at the EPC segment may be synchronized with multiple directory servers in various multi-modal communication, application deployments.

FIG. 5 illustrates major components of a system according to some embodiments where a directory server at the EPC segment may be synchronized with multiple directory servers in various multi-modal communication application deployments.

As shown in the diagram 500, the active directory server (AD) 566 at an EPC 560, described in detail in FIG. 3, may synchronize with one or more active directory servers (AD) 580, 586, and 592 in one or more multi-modal communication application deployments 578, 584, 590, respectively. The one or more multi-modal communication application deployments 578, 584, 590 may also include a front end server 582, 588, and 594, respectively, and communication application servers, 583, 589, and 595, respectively. The communication application servers may include A/V MCU servers, director servers, and/or edge servers.

In some embodiments, the AD at the EPC may aggregate identity information from multiple multi-modal communication application deployments by synchronizing centrally maintained data with the individual ADs in the respective deployments as shown, in the figure.

Additionally, subscriber policies can be modified in the AD from multi-modal communication application deployment, and those changes can be reflected with AD/HSS residing in the EPC. Edge server(s) in the multi-modal communication application deployment may reside in a perimeter network and enable connectivity through UC network(s) with other users such as a remote user or a federated server (for providing connection to remote sites). Edge servers may be specialized for functionalities such as access, web conferencing, audio/video communications, and so on.

The example systems in FIG. 1 through 5 have been described with specific devices, applications, and interactions. Embodiments are not limited to systems according to these example configurations. A communication system prioritizing multi-modal communication over wireless networks may be implemented in configurations employing fewer or additional components and performing other tasks. Furthermore, specific protocols and/or interfaces may be implemented in a similar manner using the principles described herein.

Figure 6:
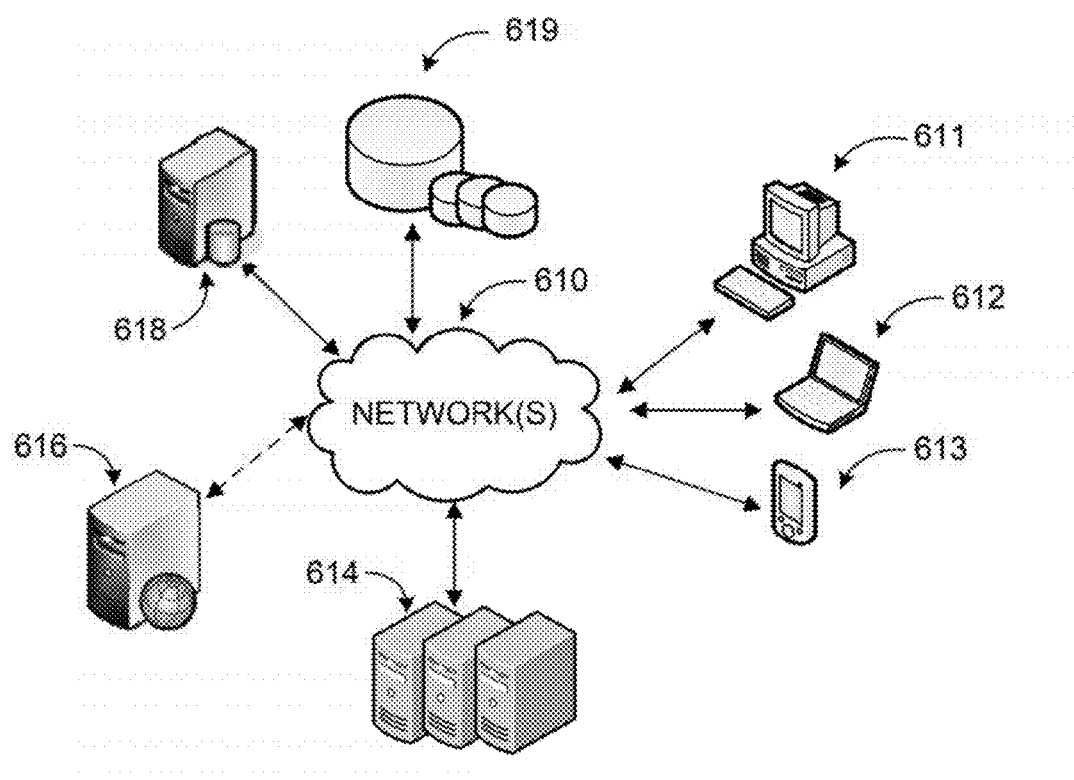
FIG. 6 is a simplified networked environment, where a system according to embodiments may be implemented.

FIG. 6 is an example networked environment, where embodiments may be implemented. A system prioritizing multi-modal communication over wireless networks may be implemented via software executed over one or more servers 614 such as a hosted service. The platform may communicate with client applications on individual computing devices such as a smart phone 613, a laptop computer 612, or desktop computer 611 ('client devices') through network(s) 610.

Client applications executed on any of the client devices 611-613 may facilitate communications via application(s) executed by servers 614, or on individual server 616. A multi-modal communication application executed on one of the servers may facilitate multi-modal communication sessions. UC control points such as a multi-modal communication application enabled node may statically or dynamically allocate bandwidth for requested communication sessions based on factors such as user profile, location, requested modalities, etc. The application may store the request for a communication session in data store(s) 619 directly or through database server 618.

Network(s) 610 may comprise any topology of servers, clients, Internet service providers, and communication media. A system according to embodiments may have a static or dynamic topology. Network(s) 610 may include secure networks such as an enterprise network, an unsecure network such as a wireless open network, or the Internet. Networks) 610 may also coordinate communication over other networks such as Public Switched Telephone Network (PSTN) or cellular networks. Furthermore, network(s) 610 may include short range wireless networks such as Bluetooth or similar ones. Network(s) 610 provide communication between the nodes described herein. By way of example, and not limitation, network(s) 610 may include wireless media such as acoustic, RF, infrared and other wireless media.

Many other configurations of computing devices, applications, data sources, and data distribution systems may be employed, to provide a UC-aware network. Furthermore, the networked environments discussed in FIG. 6 are for illustration purposes only. Embodiments are not limited to the example applications, modules, or processes.

Figure 7:
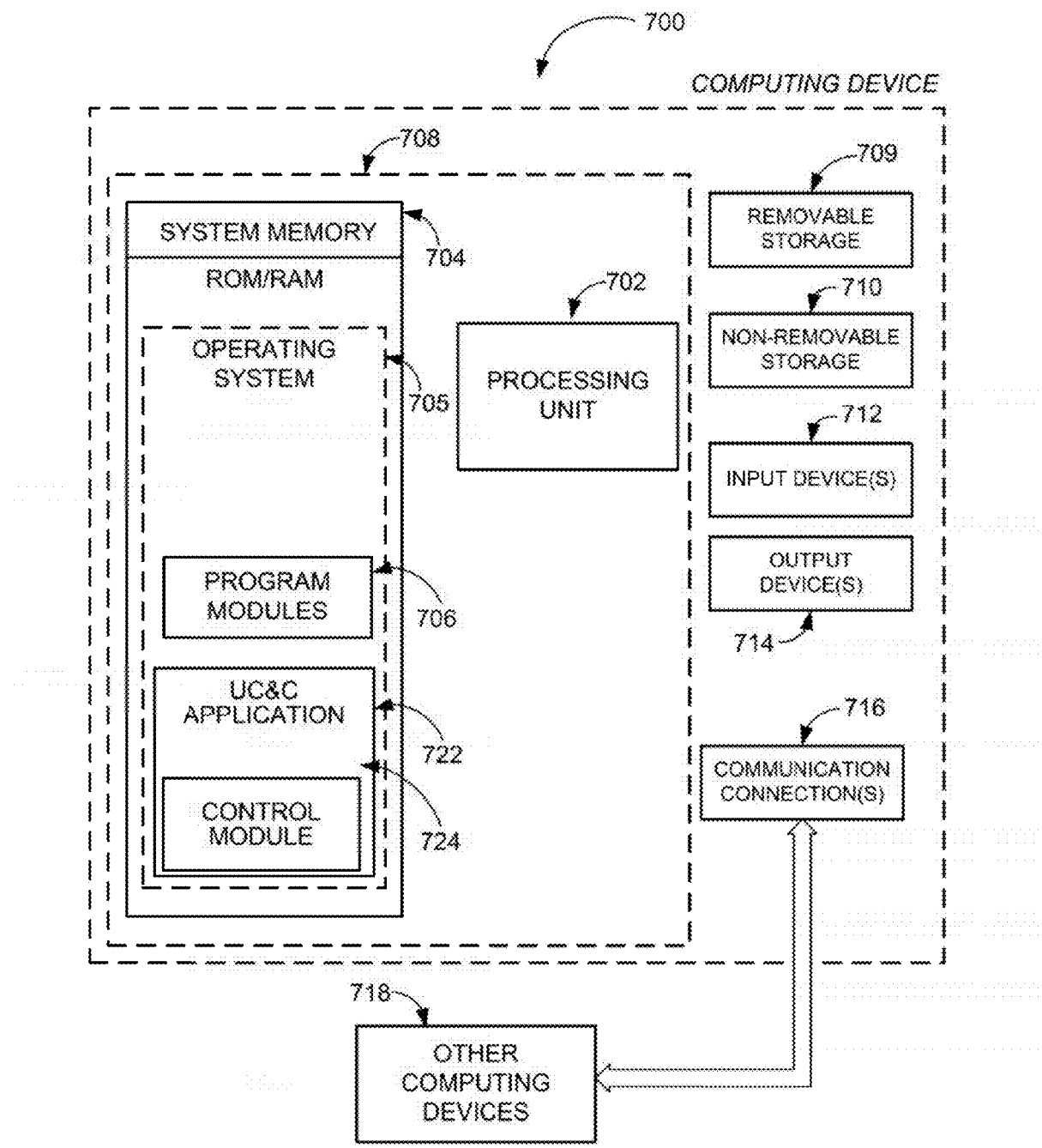
FIG. 7 is a block, diagram, of an example computing operating environment, where embodiments may be implemented.

FIG. 7 and the associated discussion are intended to provide a brief, general description of a suitable computing environment in which embodiments may be implemented. With reference to FIG. 7, a block diagram of an example computing operating environment for an application according to embodiments is illustrated, such as computing device 700. In a basic configuration, computing device 700 may be any computing device executing a UC application according to embodiments and include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, Hash memory, etc.) or some combination of the two. System memory 704 typically includes an operating system 70S suitable for controlling the operation of the platform, such as the WINDOWS® operating systems from MICROSOFT CORPORATION of Redmond, Wash. The system memory 704 may also include one or more software applications such as program modules 706, UC&C application 722, and control module 724.

UC&C application 722 may facilitate multi-modal communications and collaboration among subscribers of a UC network. In some embodiments, UC&C application 722 in coordination with the control module 724 may statically or dynamically allocate bandwidth for requested communication sessions based on factors such as user profile, location, requested modalities, etc. through a multi-modal communication application enabled node at an EPC. UC&C application 722 and control module 724 may be separate applications or integrated modules of a hosted service. This basic configuration is illustrated in FIG. 7 by those components within dashed line 708.

Computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 709 and non-removable storage 710. Computer readable storage media may include volatile and nonvolatile, removable and non-removable media implemented in any method or technology for storage of information, such as computer readable instructions, data structures, program modules, or other data. System memory 704, removable storage 709 and non-removable storage 710 are all examples of computer readable storage media. Computer readable storage media includes, bus is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 700. Any such computer readable storage media may be part of computing device 700. Computing device 700 may also have input device(s) 712 such as keyboard, mouse, pen, voice input device, touch input device, an optical capture device for detecting gestures, and comparable input devices. Output device(s) 714 such as a display, speakers, printer, and other types of output devices may also be included. These devices are well known in the art and need not be discussed at length here.

Computing device 700 may also contain communication connections 716 that allow the device to communicate with other devices 718, such as over a wired or wireless network in a distributed computing environment, a satellite link, a cellular link, a short range-network, and comparable mechanisms. Other devices 718 may include computer device(s) that execute communication applications, web servers, and comparable devices. Communication connection(s) 716 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be perforated its conjunction with one or more human operators performing some. These human operators need not be collocated with each other, but each can be only with a machine that performs a portion of the program.

Figure 8:
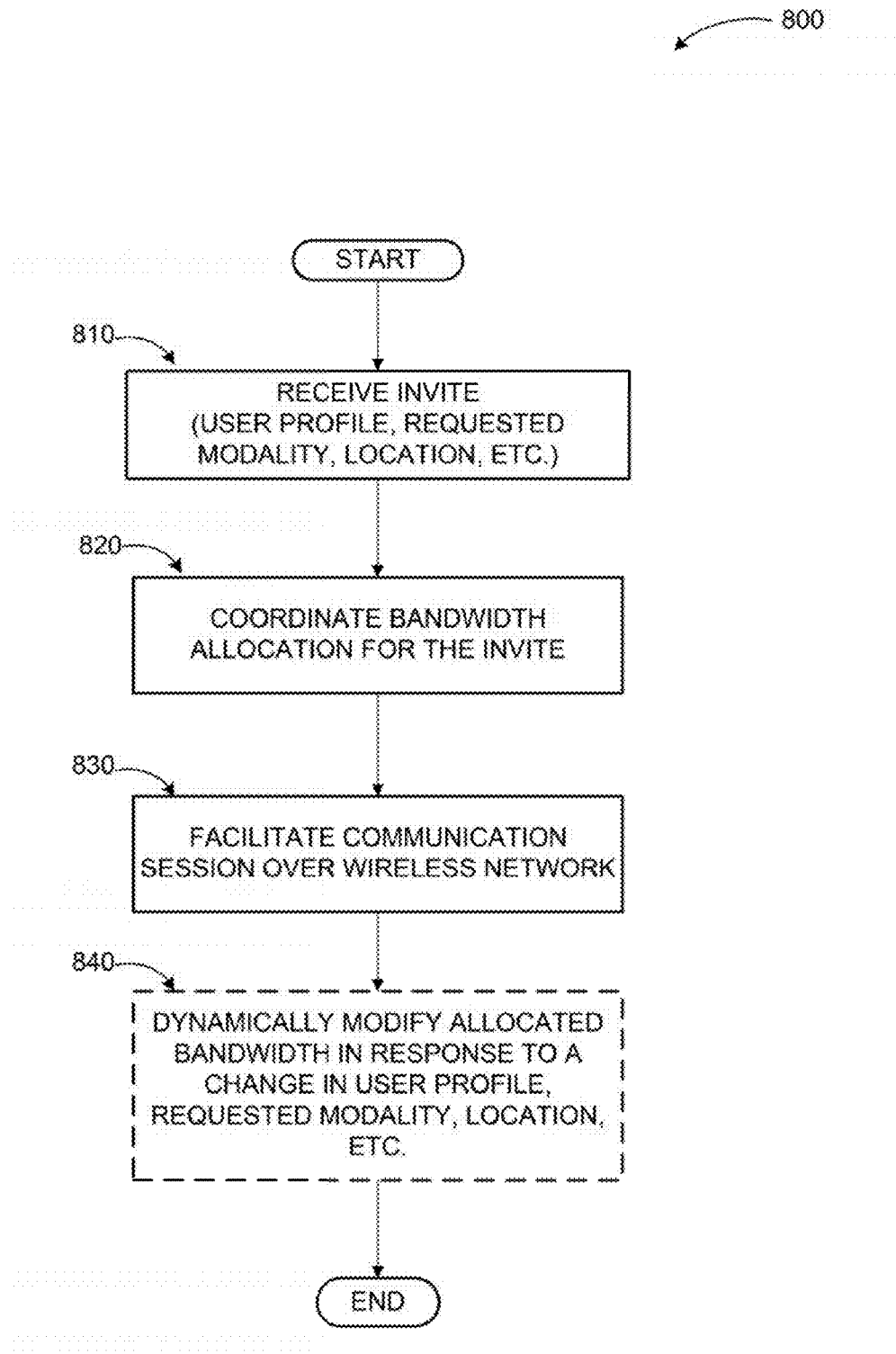
FIG. 8 illustrates a logic flow diagram for a process of prioritizing multi-modal communications over wireless networks according to embodiments.

FIG. 8 illustrates a logic flow diagram for a process of providing prioritization of multi-modal communication over wireless networks according to embodiments. Process 800 may be implemented on a multi-modal communication application enabled node of the EPC segment of a UC network. The communication sessions may include an audio call, an application sharing session, a data sharing session, a whiteboard sharing session, and/or a video conference.

Process 800 begins with operation 810, where an INVITE or a request for a communication session is received. The node may determine from the INVITE and information associated with the requestor from the AD a user profile, a location of the user, and requested modality(ies).

At operation 820, the node may coordinate bandwidth allocation by instructing a PCRF based on the above-determined factors. The requested communication session may be facilitated at operation 830 over a wireless network with the allocated bandwidth to maintain a desired QoS. At optional operation 840, the allocated bandwidth may be modified dynamically in response to a change in any one of the above-described factors (location, user profile, etc.). Thus, communication may be enabled through multiple profiles depending on a cost of connection and a location of the communication device, where each profile is characterized by a distinct QoS and a controlled experience provided when roaming across different service providers according to some embodiments. The controlled experience may be characterized by one or more of a consistency of communication experience across the different service providers and a cost optimization with reduced QoS employing different profiles. The multiple profiles may be managed through global active directory presence across roaming partners.

The operations included in process 800 are for illustration purposes. A UC-aware communication system may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device for facilitating unified communication (UC) sessions over a wireless network, the method comprising:
   receiving a request for a communication session;
   determining a session description protocol (SDP) content of the request;
   determining a user profile and one or more requested modalities associated with the communication session;
   allocating a bandwidth to the communication session such that a Quality of Service (QoS) level based on the SDP content of the request, the user profile, and the one or more requested modalities is maintained during the communication session;
   facilitating the communication session over the wireless network;
   detecting an edit in one or more of the SDP content of the request, the user profile, and the one or more requested modalities; and
   modifying the allocation of the bandwidth in response to a detection of the edit.

2. The method of claim 1, further comprising:
   determining a location attribute of a requesting subscriber; and
   allocating the bandwidth such that the QoS level is further based on the location attribute of the subscriber.

3. The method of claim 2, wherein the location attribute includes one of a roaming location attribute and a not-roaming attribute.

4. The method of claim 1, wherein the request for the communication session is received at an evolved packet core (EPC) from one or more nodes present within the wireless network through one or more interfaces.

5. The method of claim 4, wherein the one or more nodes connect to a Mobility Management Entity (MME) and a Serving Gateway/Packet Data Network Gateway (S-GW/P-GW) within the EPC.

6. The method of claim 4, wherein the one or more nodes communicate directly with end devices within the wireless network.

7. The method of claim 6, wherein the end devices within the wireless network include one or more of a smart phone, a cellular phone, a computing device executing a communication application, a smart automobile console, and advanced phone devices with added functionality.

8. The method of claim 1, wherein the communication session is at least one from a set of: an audio call, an application sharing session, a data sharing session, a whiteboard sharing session, a video conference, and a collaboration exchange.

9. The method of claim 1, wherein the wireless network includes one or more of a Wireless Local Area Network (WLAN), a Wide Area Network (WAN), and a cellular network.

10. A computing device for facilitating unified communication (UC) sessions over a wireless network, the computing device comprising:
    a memory;
    a processor coupled to the memory, the processor executing a Unified Communication and Collaboration (UC&C) application in conjunction with instructions stored in the memory, wherein the UC&C application is configured to:
    receive a request for a communication session;
    determine a session description protocol (SDP) content of the request;

determine a user profile and one or more requested modalities associated with the communication session;

allocate a bandwidth to the communication session such that a Quality of Service (QoS) level based on the SDP content of the request, the user profile, and the one or more requested modalities is maintained during the communication session;

facilitate the communication session over the wireless network;

detect an edit in one or more of the SDP content of the request, the user profile, and the one or more requested modalities; and modify the allocation of the bandwidth in response to a detection of the edit.

11. The computing device of claim 10, wherein the computing device is a multi-modal communication application enabled node at an evolved packet core (EPC).

12. The computing device of claim 11, wherein the multi-modal communication application enabled node is one of a part of a Policy and Charging Rules Function (PCRF) node and a separate node.

13. The computing device of claim 10, wherein the UC&C application is configured to synchronize one or more directory databases at one or more multi-modal communication application deployments.

14. The computing device of claim 13, wherein the one or more multi-modal communication application deployments include an active directory, a front end server, and communication application servers.

* * * * *